United States Patent [19]

Marzari et al.

[11] Patent Number: 4,797,556
[45] Date of Patent: Jan. 10, 1989

[54] OPTICAL CONTINUITY TESTING APPARATUS WITH PULSATING TRANSMITTER

[75] Inventors: Robert L. Marzari; Robert K. Southard; William J. Stape, all of Harrisburg, Pa.

[73] Assignee: AMP Incorporated, Harrisburg, Pa.

[21] Appl. No.: 105,800

[22] Filed: Oct. 7, 1987

Related U.S. Application Data

[63] Continuation-in-part of Ser. No. 842,613, Mar. 21, 1986.

[51] Int. Cl.⁴ .............................................. G02B 27/00
[52] U.S. Cl. .............................. 250/551; 250/214 RC; 356/73.1
[58] Field of Search ............... 356/73.1; 455/602, 603, 455/606, 609–613, 617, 619; 250/214 A, 214 AG, 551, 214 RC, 227; 350/96.29, 96.15

[56] References Cited

U.S. PATENT DOCUMENTS

| | | | |
|---|---|---|---|
| 4,234,253 | 11/1980 | Higginbotham et al. | 356/73.1 |
| 4,286,979 | 9/1981 | Buckler et al. | 356/73.1 |
| 4,288,161 | 9/1981 | Fortescue | 356/73.1 |
| 4,309,105 | 1/1982 | Lebduska | 356/73.1 |
| 4,467,192 | 8/1984 | Velo | 250/214 AG |
| 4,521,115 | 6/1985 | Higginbotham et al. | 356/73.1 |
| 4,548,494 | 10/1985 | Geckeler et al. | 356/73.1 |
| 4,606,632 | 8/1986 | Hillerich | 356/73.1 |
| 4,632,544 | 12/1986 | Form | 356/73.1 |
| 4,637,072 | 1/1987 | Mellström | 356/73.1 |
| 4,668,044 | 5/1987 | D'Auria et al. | 455/612 |
| 4,671,653 | 1/1987 | So et al. | 356/73.1 |
| 4,708,422 | 11/1987 | Arnoux et al. | 356/73.1 |
| 4,712,096 | 12/1987 | Cholin et al. | 350/96.29 |
| 4,726,676 | 2/1988 | Maslaney et al. | 356/73.1 |

OTHER PUBLICATIONS

Barnoski et al., "Measurements in Fiber Optics" *Proceedings of the IEEE* vol. 66, No. 4, 4/78, pp. 429–440.
Brochure describing AQ-1304–1317 LED LIGHT SOURCE.
Brochure describing OPTICAL POWER METER OPT 110.

*Primary Examiner*—David C. Nelms
*Assistant Examiner*—Michael Messinger
*Attorney, Agent, or Firm*—Gerald K. Kita

[57] ABSTRACT

A receiver for receiving an optical test signal from an optical transmitter pulsating at a selected repetition rate is disclosed. The receiver comprises an optical detector for sampling the test signal and generating a voltage signal pulsating at the repetition rate and with an amplitude proportional to the amplitude of the sampled test signal. The receiver also includes an indicator for indicating the amplitude of the test signal relative to the amplitude of a calibration signal.

11 Claims, 5 Drawing Sheets

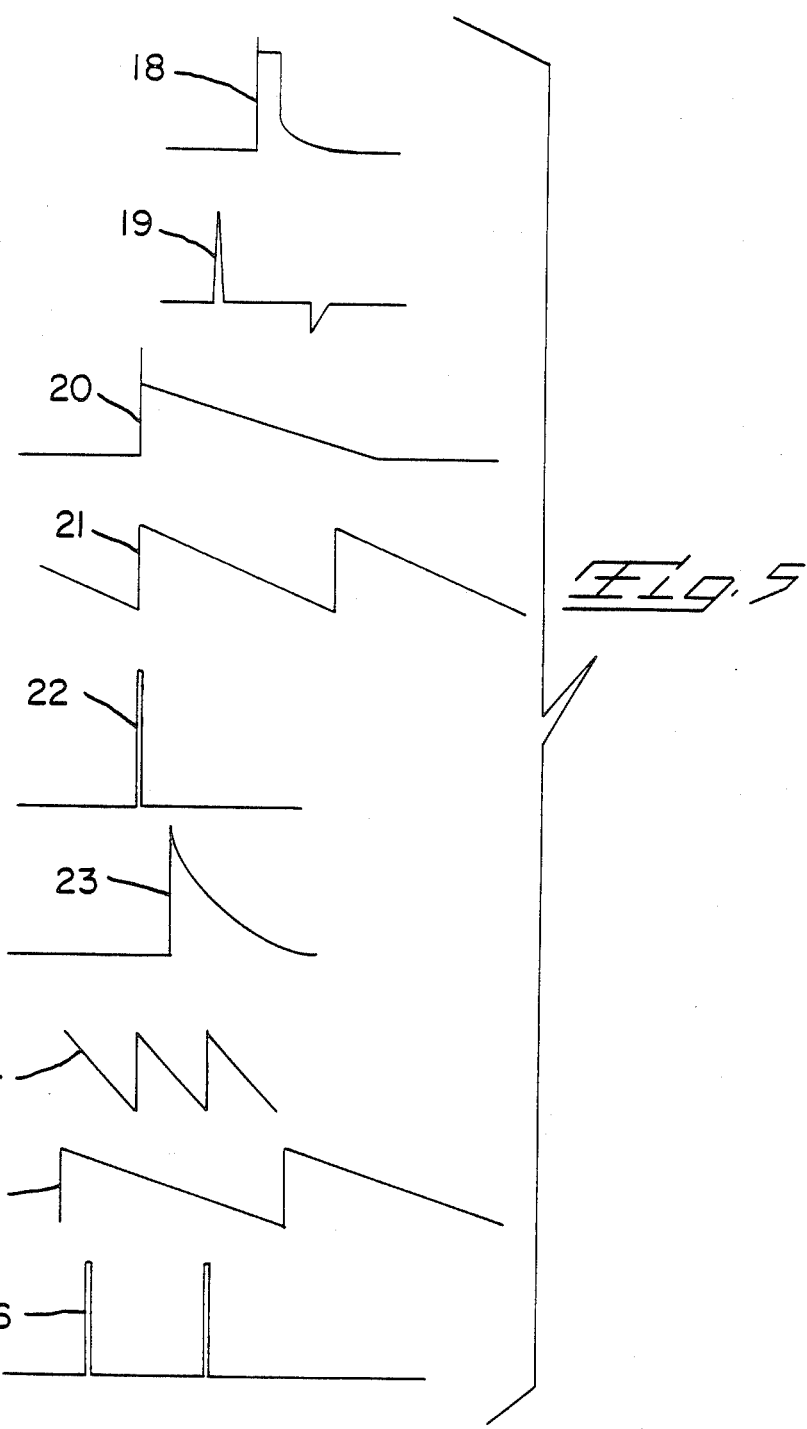

OPTICAL CONTINUITY TESTING APPARATUS WITH PULSATING TRANSMITTER

RELATED APPLICATION

The present application is a continuation-in-part of U.S. patent application Ser. No. 842,613 filed on Mar. 21, 1986 for Robert Louis Marzari, Robert Keith Southard, and William Joseph Stape and assigned to the assignee hereof.

FIELD OF THE INVENTION

The present invention relates to an apparatus for testing the continuity of an optical system such as an optical fiber system and for assisting in adjusting portions of the system to reduce losses of the test signal during propagation along the system.

BACKGROUND OF THE INVENTION

An optical transmission system, in part, comprises a series of optical fiber cables. The transmission system uses an optical coupling disclosed in European Published Specification No. 0128044, published on Dec. 12, 1984 to couple together the ends of each corresponding pair of cables in the series. A need exists for a transmitter, to generate an optical test signal, and for a receiver, potentially remote from the transmitter to test for continuity of the test signal propagating along the cables. A further need exists for the receiver to assist in tuning, which is defined as adjusting one cable with respect to the other cable in the coupling to make an adjustment in alignment of the ends of the corresponding pair of cables. Tuning assures that the ends of the cables are aligned to reduce losses in optical signals that are transferred from one cable to another.

SUMMARY OF THE INVENTION

According to an illustrative embodiment of the invention, a battery powered transmitter generates a pulsating optical output that serves as a pulsating test signal for coupling directly to one portion of an optical transmission system, for example, an input end of a first optical fiber cable. A remote, battery powered receiver is coupled directly to another portion of the system, for example, an output end of a second optical fiber cable connected in series with the first optical cable. The test signal is transferred from the first optical cable, through a coupling, of the type described in the aforementioned patent, and into the second optical cable where it is sampled by the receiver. The receiver, which samples the pulsating test signal, indicates the presence of the test signal at the receiver. The intensity of the sampled test signal is reduced by losses of the signal during propagation along the transmission system. The receiver further includes an indicator of the signal amplitude or intensity, and thereby a measurement of the losses in the system.

The indicator of the receiver is in the form of a visible bar indicator having an indicated position along the bar length that varies with the intensity of the sampled test signal. The indicator of the receiver further is in the form of an aural indicator, the pulsing rate of which can be made to vary with the intensity of the sampled test signal. The varying pulsing rate causes a corresponding varying tonal pitch or a varying audible intensity, whichever corresponds with the aural indicator.

The indicator can be calibrated to a full scale reading and then used to measure reductions in the signal intensity due to losses in the signal during propagation along the transmission system.

The aural indicator is particularly useful to assist in tuning portions of the optical system beyond the audible range of the aural indicator of the receiver. For example, a commercially available wireless transceiver can be used to broadcast the aural indicator output to another wireless transceiver at a location remote from the aural indicator.

The receiver reacts to the high speed time domain changes in amplitude of the pulsating test signal and produces an output voltage supplied to the indicator that varies in direct proportion to the amplitude or intensity of the time domain changes of the sampled test signal. Such high speed changes are not present in ambient light or commercially supplied alternating current electricity and related sources of light.

An object of the invention is to provide a transmitter for producing a pulsating optical test signal and a remote receiver for sampling the test signal propagating through an optical transmission system.

Another object of the invention is to provide a battery powered transmitter, for producing a pulsating optical test signal, and a battery powered receiver, for sampling the test signal and reacting to the high speed time domain changes in amplitude of the test signal to produce an output that is supplied to an indicator that varies in direct proportion to the amplitude of the time domain changes of the test signal.

Another object of the invention is to provide a transmitter, for producing a pulsating optical test signal, and a receiver for reacting to the high speed time domain changes in the amplitude of the test signal, the receiver having an aural indicator, the pulsing rate of which is varied in proportion to the amplitude of the time domain changes of the test signal being sampled by the receiver.

Another object of the invention is to provide a receiver for reacting to the high speed time domain changes in amplitude of signals of a digital nature, normally encountered in operating optical communication links.

Another object of the invention is to provide a receiver for reacting to relative optical power level variations, not absolute optical power, the receiver including an indicator for displaying optical power attenuations of a pulsating optical test signal relative to a calibration signal power level.

Another object of the invention is to provide a receiver which is self-calibrating in response to a calibration signal, the receiver being adapted to provide a measurement of optical power attenuations of an optical test signal relative to the caibration signal power level.

Other objects and advantages of the invention will be apparent from the detailed description of the invention taken in conjunction with the drawings.

DESCRIPTION OF THE DRAWINGS

FIG. 5 is a graph, not at any particular scale, of wave forms of various voltages present at corresponding locations in the receiver depicted in FIG. 4.

FIG. 6 is a graph, not to any particular scale, of wave forms of various voltages present at corresponding locations in an aural indicator portion of the receiver depicted in FIG. 4.

DESCRIPTION OF THE INVENTION

Figure 1:
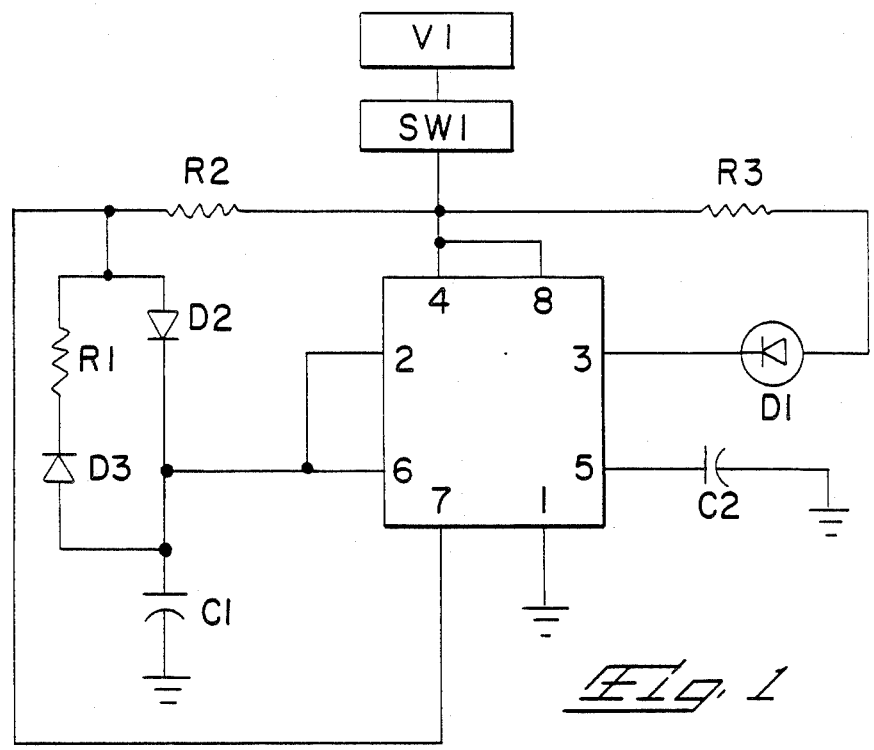
FIG. 1 is a schematic diagram of an electrical circuit depicting a transmitter for producing a pulsating optical test signal.

A transmitter 1 according to a preferred embodiment of the invention is shown in FIG. 1 as an astable oscillator, known as an astable 555 timer, for producing a pulsed voltage output signal, and more particularly, a pulsed infrared optical test signal emanating from a light emitting diode, known also as an LED, and designated D1 as shown in the Figure.

The transmitter 1 further includes an integrated circuit IC1 having electrical terminals 1 through 8 as shown in the Figure. The terminal 1 is connected to reference electrical potential as shown by the symbol in the Figure. The terminals 2 and 6 are the comparator inputs to the buffer amplifier and are connected to discrete electrical components R2, D2, C1, D3 and R1 which serve as timing components. IC1 is configured as a 555 timer. A voltage source V1 is connected by a manually operated switch SW1 to the terminals 4 and 8. A polarity protection diode (not shown) may be located between the voltage source V1 and the switch SW1. The voltage source V1 is a commercially available dry cell battery (NEDA 1604A) having an output of 9 volts DC (direct current). The switch SW1 is disclosed in U.S. Pat. No. 4,012,608.

When power is applied by switching SW1, current flows through the timing components. With the two diodes D2 and D3 in the timing circuit, the charge and discharge of capacitor C1 are independently adjustable by selection of the resistance values of resistors R1 and R2. The effect on the timing period by the voltage source V1 and ambient temperature are insignificant for the purpose of this invention. Terminals 2 and 6 of IC1 are the lower and upper inputs to the comparator or buffer amplifier portion of IC1. Terminal 4 is the reset terminal for the comparator and is held at a relatively high voltage level also as is terminal 3. When a change of state occurs at the terminal 3, it will conduct up to 100 milliamps and allow current to flow through the LED and its current limiting resistor R3.

D1 is commercially available from Honeywell Optoelectronics Corporation, Richardson, Tex. 75081, USA, having part number SE-3352-004. IC1 is commercially available from National Semiconductor Corporation, Santa Clara, Calif. 95051, USA, having part number NE555. The circuit elements of the transmitter 1 are known, are common items in commerce, and have the following values, R1 4.7 KOhms, R2 220 KOhms, R3 27 Ohms, C1 1.5 micro Farads, C2 0.01 micro Farads.

Figure 2:
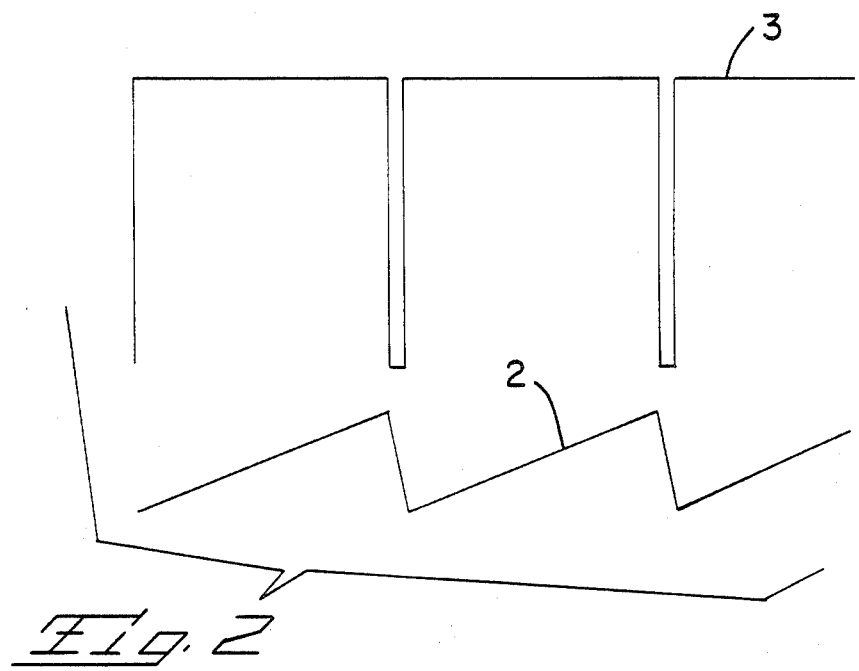
FIG. 2 is a graph, not to any particular scale, of wave forms of corresponding voltages present at corresponding locations in the transmitter depicted in FIG. 1.

The charging and discharging of C1 causes a pulse rate of 3 to 4 Hertz. This pulse rate turns the LED on and off with times of 4.88 milliseconds on and 253.9 milliseconds off, resulting in a 1.89% duty cycle, with a repetition rate of 3.86 Hz. These pulses with high speed transitions are readily distinguished from unmodulated ambient light conditions or the 60 or 120 cycles per second oscillations of light produced by commercially supplied electricity. The wave forms at terminals 2 and 3 of the transmitter are shown in FIG. 2. At terminal 3 an approximate square wave form 3 is developed, with a peak to peak voltage of 6.25 V, a positive voltage pulse width of 224 milliseconds and a negative voltage pulse width of approximately 6 milliseconds. At terminal 2, a sawtooth wave form 2 is developed, with a pulse width of 224 milliseconds and a voltage of 3 V peak to peak. The short duration of the transmitter output pulse reduces power consumption and lengthens battery life.

Figure 3:
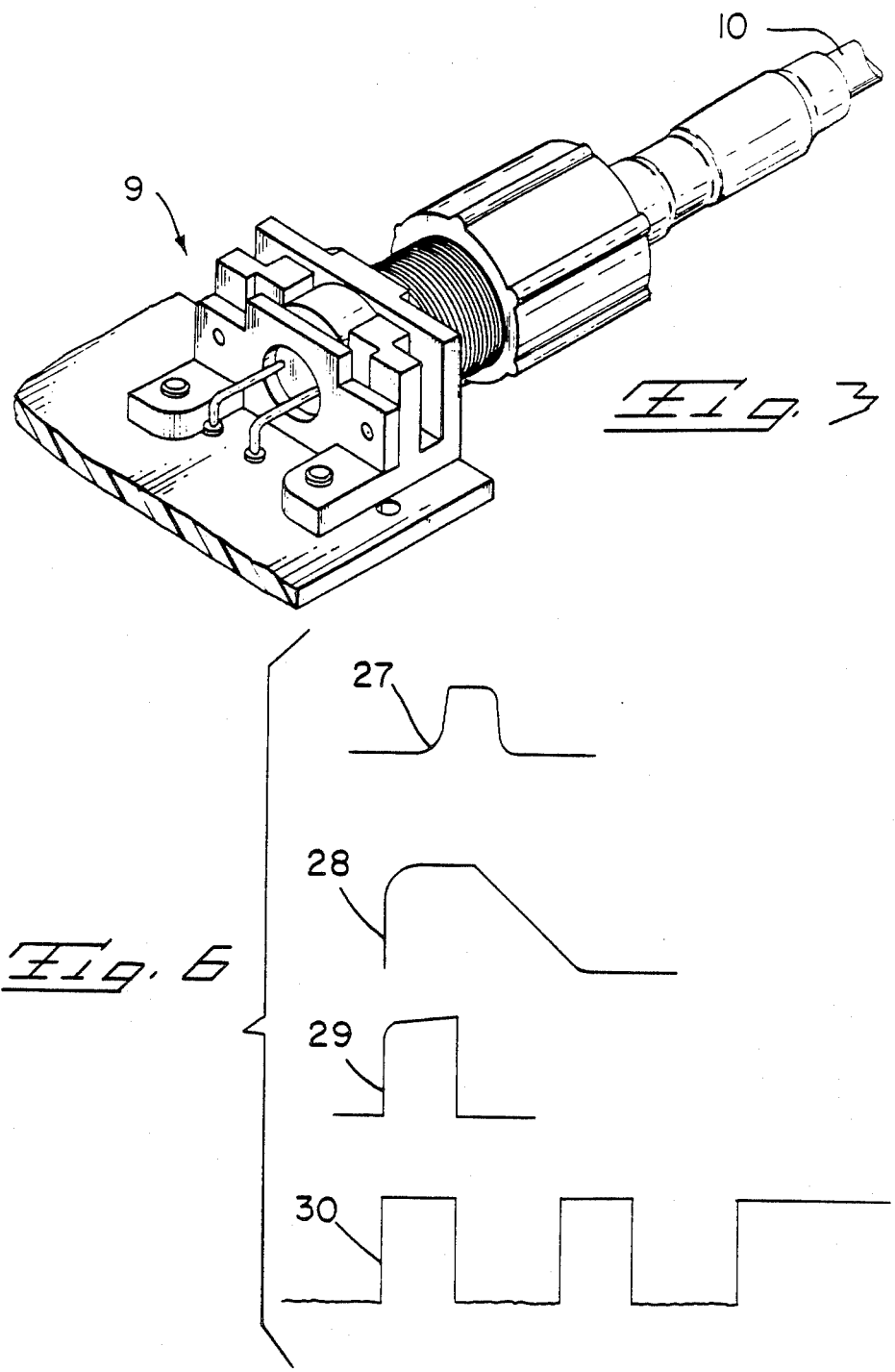
FIG. 3 is a connector for mounting an LED of the transmitter depicted in FIG. 1.

The LED is shown in FIG. 3, mounted in a connector 9 which is disclosed more completely in U.S. Pat. No. 4,273,413. The connector 9 is useful for connection of an optical fiber 10, which comprises a portion of an optical transmission system to be tested. For example, the response of the LED is 820 nanometers and is suited for connection in the connector 9 with 100/140 micron optical fiber.

Figure 4:
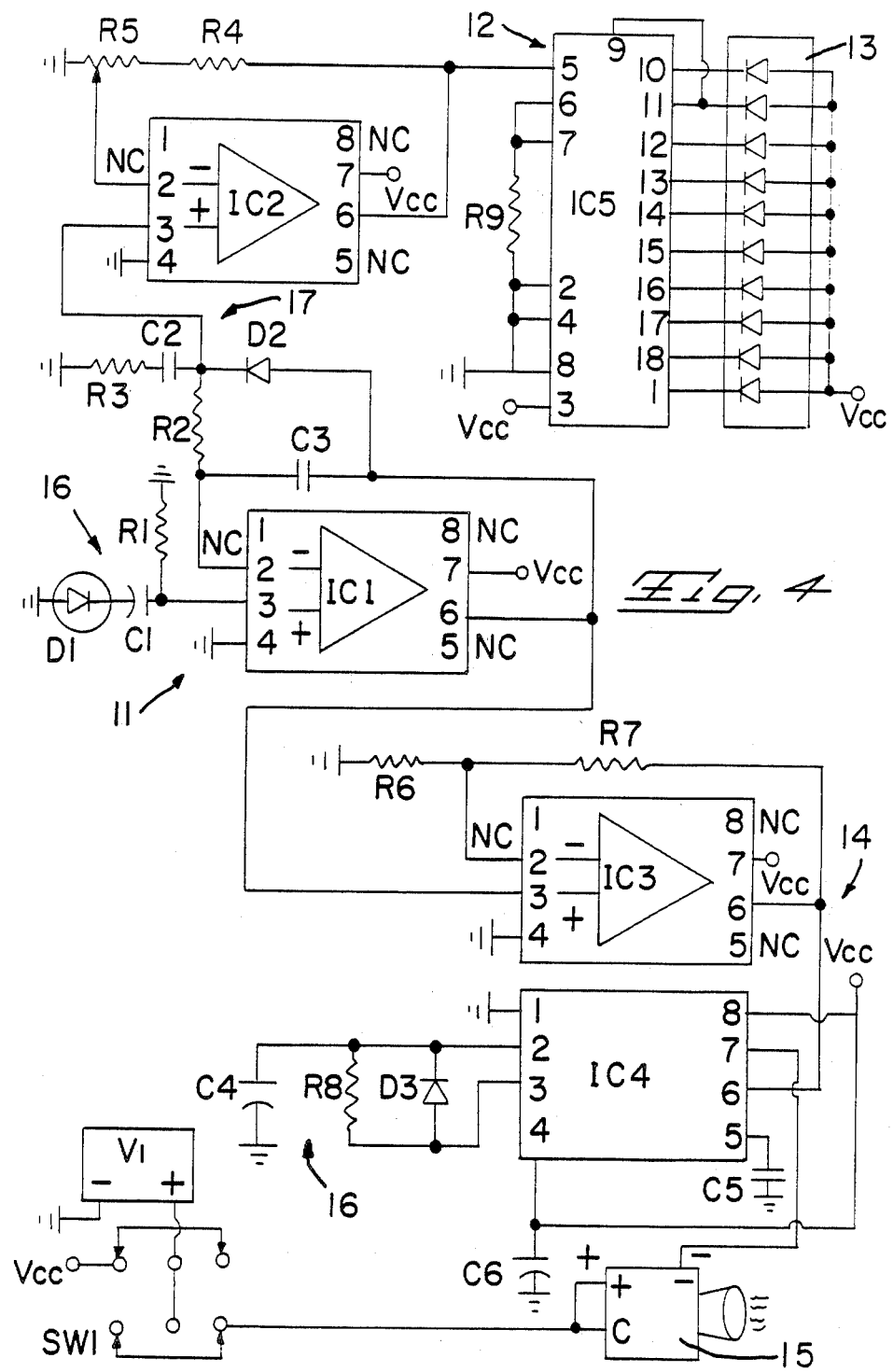
FIG. 4 is a schematic diagram of an electrical circuit depicting a receiver for a pulsating optical test signal having a visual indicator and an aural indicator.

FIG. 4 shows a circuit for a receiver 11 with a first visual indicator 12 that includes a ten segment light emitting diode (LED) display 13 and a second aural indicator 14 that includes an aural transducer 15 that converts an input voltage to an aural, pulsed output. This circuit produces a pulse aural output at the same rate as the pulses produced by the transmitter.

The receiver 11 is remote from the transmitter 1 and comprises a PIN diode D1 that upon receipt of light causes a DC current to flow that is blocked from the remainder of the receiver circuit by a filter circuit 16 comprised of resistor R1 and capacitor C1 connected as shown to a first stage amplifier comprising an integrated circuit IC1 having electrical terminals or pins numbered 1 through 8 as shown in FIG. 4. For example, ambient light produces essentially a DC current output from D1 which is blocked or attenuated by C1 of the filter circuit 16 from the first stage amplifier IC1. Also attenuated is light produced at 60 or 120 cycles per second, such as with commercially supplied electricity. The filter circuit 16 allows only modulated light, for example, the pulsed test signal from the transmitter 1, as an example, to cause a current flow from the PIN diode D1 to the input terminal 3 of IC1 of the receiver 11. An output voltage from terminal 6 of IC1 is the amplified voltage applied at terminal 3 from reaction of D1 to the pulsating test signal. The output voltage from IC1 is of short duration and is applied to a voltage pulse lengthening circuit 17 and to the visual indicator 12 and the aural indicator 14. The voltage output from terminal 6 of IC1 of the receiver 11 is applied to diode D2 of the lengthening circuit 17 and to storage capacitor C2 that stores a DC (direct current) voltage equal to the peak voltage from IC1. For example, as the input voltage to IC1 crosses zero, IC1 will drive D2 on and the output voltage from IC1 will follow the rising slope of the input voltage. When the rising voltage peaks, its slope declines and C2 is left in a charged state with diode D2 blocking the discharge of C2. The only discharge path is across resistor R3 and to pin 3 of IC1 that is an inverting input of IC1. The lengthening circuit 17 operates as a feedback circuit of IC1 and requires capacitor C3 in the circuit as shown in FIG. 4 to adjust the settling time. Resistor R2 between C2 and IC1 protects IC1 from large discharge current from C2 when IC1 is disconnected from a source of DC voltage.

FIG. 5 shows the wave forms of the voltages at various circuit junctions. A wave form 18 for a junction of D1 and C1 has a peak of 184 millivolts and a width of 5.5 milliseconds. A wave form 19 for a junction of C1 and pin 3 of IC1 has a positive peak of 30 millivolts and a width of 222 microseconds. A wave form 20 for a junction of C2 and D2 has a peak of 108 millivolts and a width of 243 milliseconds. A wave form 21 for the input to pin 2 of IC1 is 95 millivolts and a width of 241 microseconds. A wave form 22 represents the output of pin 6 of IC1 and has a peak of 77 millivolts and a width of 35 microseconds. A wave form 23 represents a voltage at pin 3 of IC2 having a pulse width of 113 microseconds and a peak of 109 millivolts. A wave form 24 represents a voltage at pin 2 of IC2 having a pulse width of 763 milliseconds and a peak of 35 millivolts. A wave form 25 represents a voltage present at pin 6 of IC2 and pin 5 of IC6 having a pulse width of 243 milliseconds and a peak of 177 millivolts. A wave form 26 represents a voltage at pin 6 of IC3 having a pulse width of 40 microseconds and a peak of 7 volts.

FIG. 4 shows the integrated circuit IC2 having the electrical terminals or pins 1 through 8 as shown in the Figure. The output voltage from pin 6 of IC1 is applied to input pin 3 of IC2, and is shown in FIG. 5 to have a short duration or pulse width. IC1 functions primarily as a peak detector that supplies its output voltage of short duration to IC2. The lengthening circuit 17 lengthens the short duration to provide an input voltage to pin 3 of IC2 of 109 millivolts peak and a width of 113 milliseconds. FIG. 5 shows a wave form 23 of the voltage applied to pin 3 of IC2. The output voltage of IC2 is applied to pin 5 of an integrated circuit IC5, having electrical terminals or pins 1 through 18 as shown in FIG. 4. Pins 1 and 10 through 18 are connected to corresponding LED's of a ten segment LED display 13 of the visual indicator 12. Resistor R4 and variable resistor R5 are in the feedback circuit of pin 6 and pin 3 of IC2 and are used to adjust the gain for IC2 such that an output voltage at pin 6 of IC2 has an analog adjustment to calibrate the number of LED's that are lighted or position of lighted LED in response to the voltage applied to pin 5 of IC5. IC5 is constructed to react to the logarithm of the voltage supplied at pin 5 and energize the LED's of display 13 to emulate an approximate 2 decibel change in the sampled test signal as a corresponding change in analog indicator signal of the display 13 in 2 decibel increments. Brightness or brilliance of the LED's is controlled by resistor R9 connected at the junction of pins 6 and 7 of IC5 and the junction of pins 2, 4 and 8 of IC5.

Calibration of the visual indicator 12 is useful for measuring losses in the test signal from the transmitter 1 occurring from propagation in an optical transmission system. For example, the transmitter 1 is coupled to a first portion of an optical transmission system, not shown, and the receiver 11 is coupled to another portion of the optical transmission system to receive a test signal from the transmitter propagating in the optical transmission system. The LED display 13 is calibrated by adjustment of R5 to vary the resistance in the feedback gain circuit of IC2, such that the top-most LED is lighted as a reaction to the test signal sampled by the receiver 11. Thereby the indicator 14 and the receiver 11 are calibrated to indicate a full scale reading. Typically, such calibration is performed manually. The calibrated receiver 11 is capable of coupling to another portion of the optical transmission system to sample the test signal. Any reduction in the full scale reading, resulting in a lighted LED in a lowered position in the display 13, will be in direct proportion to the losses of test signal from the optical transmission system.

The calibrated receiver 11 further is useful during the procedure of tuning an optical coupling of the type disclosed in European Published Specification No. 0128044, published on Dec. 12, 1984. The coupling is of sleeve form and receives the respective ends of two optical fibers aligned end to end within the coupling. The coupling enables an optical signal to be transferred from one fiber to the other without adverse losses of the signal. The transmitter 1 is coupled to a first optical fiber in the coupling. The test signal from the transmitter 1 propagates from the first optical fiber, across the coupling and through the second optical fiber. The receiver 11 is coupled to the second optical fiber and receives the test signal propagating from the first optical fiber. As one of the optical fibers is rotated in the coupling relative to the other optical fiber, the losses of the test signal will vary, due to variations in the alignment end to end of the optical fibers. The visual output (the number of LED's lighted) of the indicator 14 will vary proportionately with the losses of the test signal sampled by the receiver.

The receiver 11 includes a pulsed aural indicator 14. Either the indicator 12 or the indicator 14 or both the indicators 12 and 14 can be incorporated in the receiver 11. The indicator 14 includes an integrated circuit IC3 having the electrical terminals or pins 1 through 8 as shown in FIG. 4 and operating as a buffer amplifier. The short duration pulsed output of IC1 is applied to input pin 3 of IC3 and causes an output voltage at pin 6 of IC3. A feedback gain circuit includes R7 from pin 6 to the input pin 2 of IC3. The output voltage at pin 6 is amplified sufficiently to toggle the pin 6 of integrated circuit IC4 that has electrical terminals or pins 1 through 8 as shown in FIG. 4.

IC4 is configured as a 555 timer running in an inverted monostable state, wherein positive polarity input pulses are supplied at pin 6 of IC4, and negative sinking voltages are produced at pin 7. Pin 7 is coupled to a negative terminal of the aural transducer, and is coupled to ground electrical potential at pin 2 of IC4 for a time period determined by the timing circuit 16 comprised of circuit components, capacitor C4, resistor R8 and diode D3. Thereby IC4 couples the negative terminal of the transducer 15 to ground and enables the transducer 15 to produce an audible signal during the time period. Resistors R7 and R6 are provided in a gain feedback loop from terminal 6 of IC3 to terminal 2.

The time period of the timing circuit 16 is achieved by discharge of C4 to ground potential when the input signal supplied to terminal 6 of IC4 reaches a peak and the slope of its voltage pulse becomes negative. Successive time periods produce a pulsed audible monotonal output having a repetition rate equal to the rate of the pulsations in the signal from the transmitter 1.

FIG. 6 depicts a wave form 27 of a voltage present at pin 3 of IC3 having a peak value of 150 millivolts and a pulse width of 100 microseconds. A wave form 28 of a voltage at pin 2 of IC4 has a peak value of 4.9 volts and a pulse width of 236.3 milliseconds. A wave form 29 of a voltage present at pin 3 of IC4 has a peak value of 8.5 volts and a pulse width of 2.27 milliseconds. A wave form 30 of a voltage present at pin 7 of IC4 has a peak value at the 9 volt rating of the battery voltage source V1 of the receiver 11. The aural transducer 15 is silent during the time interval of the pulse widths of the corresponding positive voltage pulses of wave form 30. The aural transducer 15 produces an audible output during the time interval between the positive pulses of wave form 30. Typical time intervals are 0.1 seconds silent and 150 milliseconds of audible signal. Thereby a repeating audible signal is produced with a repetition rate equal to the rate of the pulsations in the test signal from the transmitter 1.

The audible signal is particularly useful to assist in tuning an optical coupling at a location that is remote from the receiver, mainly in an implementation with varying pitch or pulse rate. For example, such location may be too remote from the receiver to view the visual indicator 12, but within the range of the audible output from the aural indicator 14. The audible range of the aural indicator 14 may be extended by known, commercially available transceivers (not shown) for two way voice communication. For example, a first transceiver for voice communication is hard wired to an audio keying jack of the optical receiver 11. A second transceiver for voice communication receives the aural output of the receiver 11 transmitted from the first transceiver. The second transceiver is carried by an operator to various locations along an optical transmission system, while the operator is engaged in a process of tuning optical couplings of the system that are located beyond the audible range of the aural indicator 14 of the receiver 11. The transceivers enable the operator, working without another person, to tune portions of an optical system that are remote from the visual range or the limited audible range of the receiver 11.

FIG. 4 shows a DC voltage source V1, for example, a dry cell battery rated at 9 volts (NEDA 1604A). A double pole switch is depicted at SW1 and is known from U.S. Pat. No. 4,012,608. A position of the switch SW1 shown in FIG. 4 is a center off position. The aural transducer 15 has its corresponding positive and "C" terminals connected to a positive terminal of the battery V1 through the switch SW1. A second pole of the double pole switch SW1 connects a positive terminal of the battery V1 to an electrical terminal depicted at VCC in FIG. 4. This terminal VCC is connected also to the corresponding terminal 7 of each of the integrated circuits IC1, IC2, and IC3, the terminal 3 of IC5, the LED display 13, and terminal 8 of IC4. The switch SW1 in a second position disengages the transducer 15 from V1, thereby permitting an aural signal as a selected indicator. Alteratively, the aural indicator may be a variable tonal pitch indicator.

The circuit components for the receiver 11 are further identified as follows. IC1, IC2 and IC3 are integrated circuits commercially available from RCA Corporation, Solid State Division, Route 202, Somerville, N.J. 08876, USA, having part number CA-3140-AE. Integrated circuits IC4 and IC5 are commercially available from National Semiconductor Corporation, Santa Clara, Calif. 95051, USA, having part numbers LM555 and LM3915N, respectively. Pin diode D1 is available commercially from Honeywell Optoelectronics, Richardson, Tex. 75081, USA, having part number SD-3478-002. The circuit components of the receiver 11 have the following values: C1 is 47 pico Farads; C2 is 0.02 micro Farads; C3 is 33 pico Farads; C4 is 1.5 micro Farads TANT; C5 and C6 are each 0.01 micro Farads; diodes D2 and D3 are designated IN914; resistor R1 is 1 meg Ohm; R2 is 10 kilo Ohms; R3 is 100 Ohms; R4 and R5 are each 1 kilo Ohms; R6 is 100 Ohms; R7 is 4.7 kilo Ohms; R8 is 100 kilo Ohms; R9 is 2.7 kilo Ohms.

Figure 7:
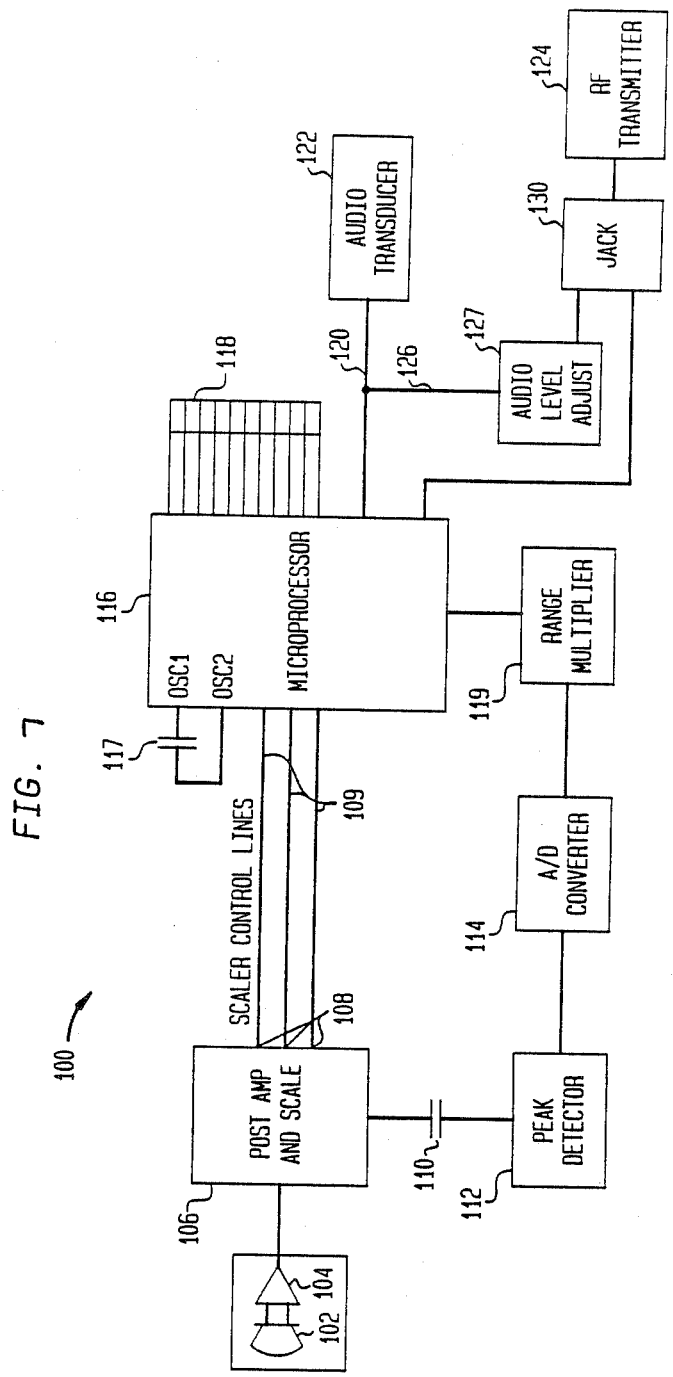
FIG. 7 is a schematic diagram of an electronic circuit depicting a self-calibrating receiver for a pulsating optical test signal.

Turning to FIG. 7, an alternative embodiment of a receiver for a pulsating optical test signal is schematically illustrated. In contrast to the receiver illustrated in FIG. 4 which is manually calibrated by adjusting the variable resistor R5, the receiver of FIG. 7 is self-calibrating.

The receiver 100 converts light power in the form of the pulsating optical test signal to electrical current using photodiode 102. The electrical current is converted to a voltage by means of pre-amplifier 104. This voltage is then applied to a multi-gain, non-inverting amplifier stage 106.

The amplifier stage 106 comprises an 8-channel analog multiplexer. Each channel can be selected, one at a time, by applying the proper binary signal to the inputs 108. The binary signal is generated by the microprocessor 116 in a manner described below and transmitted to the inputs 108 via lines 109. The gains of the amplifier stage 106 that can be selected in this manner are 1, 2, 4, 8, 16, 32, 64, 128.

The receiver 100 of FIG. 7 is intended to interface with an optical transmitter of the type described herein and ilustrated in FIG. 1. Such a transmitter may generate 1.5 millisecond wide optical test pulses at a repetition rate of 16.6 Hertz. These pulses have rise and fall times of less than 1 microsecond. A.C. decoupling capacitor 110 serves to pass electronic signals derived from optical test pulses generated by the transmitter. Electronic signals resulting from external light sources such as 60 Hertz sources are not transmitted through the decoupling capacitor 110.

Thus, optical test pulses produced by the transmitter of FIG. 1 are detected by photodiode 102. The resulting current pulses are converted to voltage pulses by pre-amplifier 104 and these voltage pulses are amplified by the multi-gain amplifier stage 106. The peak detector 112 which is coupled to the capacitor 110 temporarily stores the peak voltage values of at least some of the amplified voltage pulses. The stored peak voltage values are then digitized using analog-to-digital covverter 114 which operates under the control of the microprocessor 116.

Typically, the analog-to-digital converter 114 is a dual slope analog-to-digital converter. In this type of analog-to-digital converter, the input signal (i.e. the voltage stored in the peak detector 112) is integrated for a fixed period of time starting from a reference voltage. Illustratively, the fixed period of time is 60 milliseconds. The final value of the signal integral becomes the initial condition for the integration of a reference signal in the opposite direction, while a clock output is counted. When the net integral has returned to the reference voltage, the count stops. The number of counts (i.e. the ramp downtime) is proportional to the input signal and provides a digital representation thereof. The digital output of the A/D converter 114 is transmitted to the microprocessor 116 which in turn causes selected elements in the LED bar display 118 to light up. Typically, the bar display 118 is updated once every ½ second. Power to the circuit components comprising the receiver 100 of FIG. 7 is supplied by a battery operated voltage supply not shown. Timing for the microprocessor 16 is supplied by external clock 117.

The receiver of FIG. 7 is used to measure relative optical power level variations, not absolute optical power. Using the LED Bar display (which illustratively comprises ten segments) a range of 20 decibels of power variations can be displayed. A full scale 0 db power level is set by calibrating the device to an incoming signal. Until the receiver is recalibrated, it will display optical power attenuations relative to the calibration power level. When the power to the receiver is turned off, the calibration value is lost; and when the device is powered again, it will use a default calibration level unless it is recalibrated.

The device 100 of FIG. 7 may be calibrated as follows. A calibration signal in the form of a pulsating optical test signal is supplied to the diode 102. By definition the calibration signal has a zero db attenuation power level. The resulting electronic signals are processed in amplifier stages 104 and 106 and the peak voltage values of the resulting voltage pulses are temporarily stored in the peak detector 112 for conversion to a digital signal. When calibration on an incoming signal is performed, the microprocessor looks for a ramp downtime of the dual slope A/D converter in a particular range (e.g. 60 millsec < ramp downtime < 120 millisec). The processor 116 first samples the signal at the highest gain setting of the amplifier stage 106. If the ramp downtime is too large, the processor causes the amplifier stage 106 to switch to the next lower gain channel by transmitting appropriate signals via lines 109. The ramp downtime is then sampled again. After an acceptable calibration channel has been found, the microprocessor 116 will use this channel to span a 0 db–20 db range of attenuations from the calibration signal power level. A switch (not shown) may be provided to initiate the calibration operation and to switch from a calibration to an operational mode. Using this calibration procedure, minimum sensitivity reference levels are selected when the optical ports of the transmitter and receiver are held together during calibration. Intermediate sensitivity reference levels are selected by placing a reference fiber between the transmitter and receiver. Maximum sensitivity reference levels are achieved by covering the receiver during calibration.

Illustratively, the LED bar display comprises 10 segments, with each bar corresponding to 2 db of attenuation for a total range of 0 to −20 db of attenuation. The display resolution is 0.5 db as shown by the following sample at −2 db.

Constant flashing of the −2 db bar = −2.0 db
3 flashes −2 db bar, 1 flash −4 db bar = −2.5 db
2 flashes −2 db bar, 2 flashes −4 db bar = −3.0 db
1 flash −2 db bar, 3 flashes −4 db bar = −3.5 db
Constant flashing of −4 db bar = −4.0 db This scheme is made possible as a result of conventional programming of the microprocessor 116.

A range multiplier 119 may be included in the receiver to extend the range of the receiver in particular circumstances. For example, the receiver may be calibrated for minimum sensitivity levels, for example, by holding together the optical ports of the transmitter and receiver. In operation, however, the optical test signal may be transmitted through an optical system with a very high attenuation, i.e. an attenuation in excess of −20 db. Without use of the range multiplier 119, the bar display will not indicate the presence of the test signal at the receiver. In this case, the range multiplier 117 multiplies the digital signal of the output of the A/D converter 114 so that some indication of the test signal appears on the bar display. It should be noted, however, that this indication on the bar display is not relative to the calibration signal level. The range multiplier 119 is not active if the received test signal is within −20 db of the calibration signal.

In addition to the bar display indicator, the receiver 100 also includes an audible indicator of the relative power level of the received optical test signal. In particular, the microprocessor provides an audio signal on line 120 which is transmitted to an audio transducer 122 such as a ceramic audio transducer. In response to the audio signal provided by the microprocessor, the audio transducer 122 generates pulsed audible tones that are proportional in audio frequency to the measured power levels. The audio signal may also be connected to an external RF transmitter 124 which enables the audio signal to be transmitted to a remote location such as the location of the transmitter which generates the optical test signal or any other location along the optical system under test within the constraints of the coverage of the RF transmitter. Illustratively, the RF transmitter 124 is located external to receiver 100 and is hard wired by means of a two-conductor cable with shield to a jack 130 contained within the receiver 100. Illustratively, the RF transmitter 124 is a Midland LMR 70-253 UHF portable.

The audio signal is transmitted to the jack 130 via line 126 which includes an audio level adjuster 127. The jack 130 also includes a push-to-talk circuit for the external RF transmitter which enables the optional RF transmitter.

In operation, when power is applied, the receiver of FIG. 7 will perform a self-test illustratively comprising cycling through each bar of its LED bar graph twice, then sounding an audio tone. After this, the receiver of FIG. 7 will calibrate itself using the signal impinging on the photodiode 102 as a full scale (0 db) value. After calibration the receiver enters normal operation.

Finally, the above-described embodiments of the invention are intended to be illustrative only. Numerous alternative embodiments may be devised by those skilled in the art without departing from the spirit and scope of the following claims.

We claim:

1. Apparatus for receiving an optical test signal from a transmitter pulsating at a selected repetition rate comprising, optical detector means for sampling the test signal and generating a voltage signal pulsating at said repetition rate and with an amplitude proportionate to the amplitude of the sampled test signal, an indicator for indicating the amplitude of the sampled test signal, amplifying means connected between the indicator and the detector means, and a filter circuit for eliminating voltage signals resulting from optical sources other than said test signal.

2. Apparatus as recited in claim 1 and further comprising, calibration means for calibrating the indicator to a full scale reading as a reaction to the sampled test signal.

3. Apparatus for receiving an optical test signal, as recited in claim 1, and further comprising a portable voltage source.

4. The apparatus as recited in claim 1 wherein said optical detector means comprises:
   a photodiode for converting said optical test signal into a pulsating current signal, and
   a pre-amplifier for converting said current signal into said pulsating voltage signal.

5. The apparatus of claim 1 wherein said indicator comprises an audio transducer for generating audio tones.

6. The apparatus of claim 5 wherein said apparatus further comprises a transmitter for transmitting said audio tones to a remote location.

7. The apparatus of claim 1 wherein said indicator comprises an audio transducer adapted to generate audio tones that are proportional in audio frequency to measured power levels.

8. The apparatus of claim 1 wherein said indicator comprises a visual display and an audio transducer.

9. The apparatus of claim 1 wherein said indicator is an LED bar graph display.

10. Apparatus for receiving an optical test signal, as recited in claim 1, and further comprising, a voltage lengthening circuit for lengthening pulses comprising said voltage signal.

11. Apparatus for receiving an optical test signal from a transmitter pulsating at a selected repetition rate comprising optical detector means for sampling the test signal and generating a voltage signal pulsating at said repetition rate and with an amplitude proportionate to the amplitude of the sampled test signal, an adjustable gain amplifier for amplifying said voltage signal, filter means adapted to react to high speed amplitude transitions of said voltage signal, and indicator means for indicating the amplitude of the sampled test signal relative to a calibration signal amplitude.

* * * * *